United States Patent
Delajoud

[11] Patent Number: 5,257,640
[45] Date of Patent: Nov. 2, 1993

[54] FINE PRESSURE CONTROL SYSTEM FOR HIGH PRESSURE GAS

[76] Inventor: Pierre R. Delajoud, 109 rue de Longchamp, 92200 Neuilly sur Seine, France

[21] Appl. No.: 780,707

[22] Filed: Oct. 18, 1991

[51] Int. Cl.⁵ .............................. G05D 16/20
[52] U.S. Cl. ...................... 137/14; 73/4 R; 137/102; 137/341
[58] Field of Search ............ 137/14, 341, 102; 73/4 R

[56] References Cited

U.S. PATENT DOCUMENTS

| | | | |
|---|---|---|---|
| 2,261,364 | 11/1941 | Grove | 137/341 |
| 3,111,134 | 11/1963 | Musser | 137/102 |
| 3,250,872 | 5/1966 | Hellman | 73/4 R |
| 3,429,337 | 2/1969 | Raymond | 137/488 |
| 3,516,429 | 6/1970 | Sandstede et al. | 137/87 |
| 3,653,393 | 4/1972 | Love | 137/102 |
| 3,858,598 | 1/1975 | Carman et al. | 137/102 |
| 3,930,515 | 1/1976 | Kennedy et al. | 137/102 |
| 4,026,580 | 5/1977 | Wulf et al. | 137/341 X |
| 4,241,750 | 12/1980 | Furuse et al. | 137/101.19 |
| 4,253,480 | 3/1981 | Kessel et al. | 137/102 |
| 4,304,250 | 12/1981 | Snyder | 137/102 |
| 4,552,011 | 11/1985 | Wiley | 73/4 R |
| 4,669,317 | 6/1987 | Delajoud | 73/4 R |
| 4,700,739 | 10/1987 | Flohr | 137/488 |
| 4,730,101 | 3/1988 | Mahon et al. | 219/508 |
| 4,883,084 | 11/1989 | Walter | 137/118 |
| 4,906,820 | 3/1990 | Haarmann et al. | 219/497 |
| 5,020,564 | 6/1991 | Thoman et al. | 137/102 |

FOREIGN PATENT DOCUMENTS 1420411  8/1988  U.S.S.R. .................. 73/4 R

*Primary Examiner*—Stephen M. Hepperle
*Attorney, Agent, or Firm*—Cahill, Sutton & Thomas

[57] ABSTRACT

A system for precisely controlling gas under high pressure produces an initial gas pressure in a pressure chamber while applying a predetermined amount of power to a heating element located in the pressure chamber and then applies a computed change of power to produce an average gas temperature increase or decrease in the pressure chamber and thereby rapidly produce an increase or decrease in gas pressure with resolution limited by the resolution of measurement of gas pressure in the pressure chamber and the application of the computed change of power. The described invention is particularly advantageous at gas pressure above roughly 1000 pounds per square inch.

13 Claims, 1 Drawing Sheet

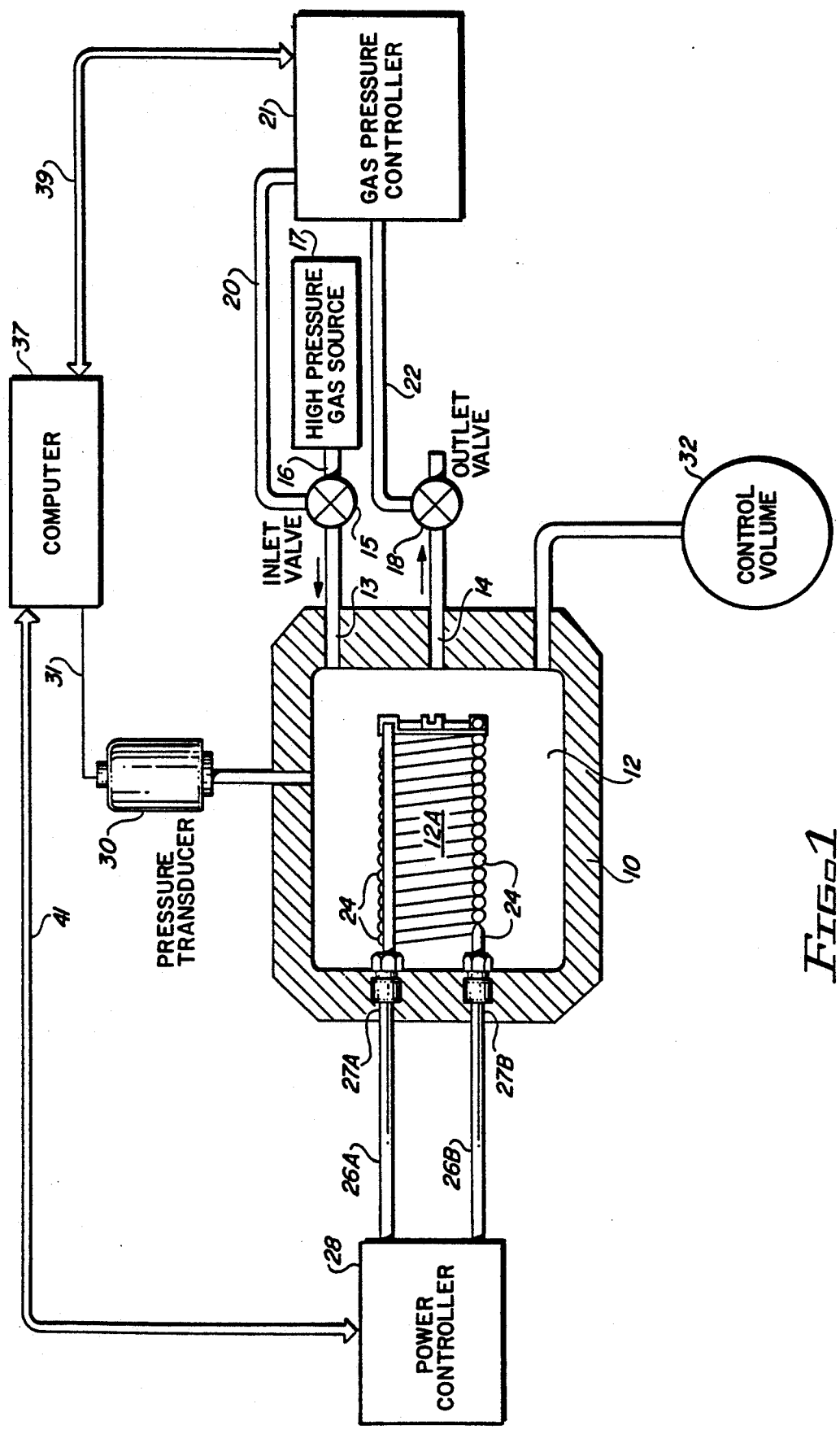

FINE PRESSURE CONTROL SYSTEM FOR HIGH PRESSURE GAS

BACKGROUND OF THE INVENTION

The invention relates to precise control of gases at high pressure.

There are various situations in which gas pressure must be precisely controlled, for example in low gas pressure measurement, control, or calibration instruments and in high gas pressure measurement, control, or calibration instruments. The present state of the art limits the precision with which gas pressure can be controlled at pressures above about 1000 to 2500 pounds per square inch to about ±0.05 percent. Generally, the more precise currently available high gas pressure devices are, the slower and less reliable they are. Below approximately 2500 pounds per square inch gas pressure, some available devices are capable of precision of better than ±0.01 percent, but above 2500 pounds per square inch gas pressure presently available devices have precision limited to about ±0.05 percent.

The present assignee markets a computerized pressure controller system that is capable of setting and stabilizing gas pressure to within ±0.001 percent or better, if the gas pressures are less than approximately 1000 pounds per square inch, by differentially opening and closing both an inlet solenoid valve and an exhaust solenoid valve connected to common pressure chamber. That computerized system can repeatedly measure the pressure in a pressure chamber and operate on the measured data by means of an algorithm to differentially open and close both the inlet solenoid valve and the outlet solenoid valve so as to produce very minute controlled increases or decreases in pressure in the pressure chamber. In some prior systems, variable orifice valves are controlled to produce a desired pressure in the pressure chamber (and in a control volume). In such devices which use solenoid valves or variable orifice valves or screw presses, mechanical hysteresis associated with the valves or seals of screw presses causes loss of precision in maintaining the controlled pressure to within desired limits. Such mechanical hysteresis prevents mechanical valves or screw presses from operating ideally, and increases with time and wear of the valves. It is very desirable to be able to avoid the effects of mechanical hysteresis in gas control valves variable orifice valves, or screw presses.

Unfortunately, the above described technique using mechanical valves is impractical at pressures substantially higher than about 1000 to 2000 pounds per square inch, because as the gas pressure increases the mechanical solenoid valves require proportionately higher amounts of physical force on the valve elements, and the amounts of power required to produce such forces also increase as the pressure of gas increases. Because of the higher physical forces on the valve elements, there is rapid wear of the seals and the seat of the valves, resulting in gas leakage that deteriorates performance of the system. Also, thermal problems become much more severe at the higher power levels, and power supplies become much more expensive; the thermal problems referred to occur because coils in the solenoid valves become hot, and that causes gas in the system to be heated in an uncontrolled manner, producing undesired and uncontrolled gas pressure changes. The only commercially available systems that operate at gas pressures above roughly 1000 to 2000 pounds per square inch are not as reliable as is often desired, and reliability decreases as the resolution is increased. Consequently, mechanical valves frequently must be rebuilt at considerable cost and inconvenience. System performance deteriorates gradually as the above-mentioned mechanical hysteresis and limited resolution problems become worse and as the valves begin to leak.

Most prior high gas pressure control systems that attempt to achieve high resolution, especially systems using variable orifice valves, waste large amounts of gas.

Those skilled in the art will recognize that it is very important that no pressure overshoot occur in a high gas pressure control system used for calibrating pressure measurement, control, or calibration devices, because pressure overshoot prevents accurate characterization of the hysteresis of such devices. It should be appreciated that it is very difficult to achieve speed in measurement or calibration of such devices without "overshooting" of the control pressure, because of the above-mentioned limitations in overall resolution of prior devices due to the resolution limitations of the mechanical valve components. Similarly, if the controlled high gas pressure being generated is used to control a manufacturing process, overshooting of the pressure above the target value often is not acceptable.

Avoiding pressure overshooting while obtaining fast attainment of the target pressure presents a formidable design challenge that has not been successfully met in the art. There is an unmet need for an economical and reliable system for more rapidly and precisely controlling highly pressurized gas than has previously been achieved.

SUMMARY OF THE INVENTION

It is an object of the invention to provide a method and apparatus that achieves more precise control of pressurized gas, especially at high pressure than previously has been achieved.

It is another object of the invention to provide a high pressure gas control system the precision of which does not depend primarily on the precision of controlling inlet and outlet valves or variable orifice devices of a pressure chamber.

It is another object of the invention to avoid the effects of mechanical hysteresis in gas control valves, variable orifice devices, and the like.

It is another object of the invention to provide a high gas pressure control device that overcomes limitations in resolution imposed by mechanical valves and mechanical variable orifice devices.

It is another object of the invention to reduce the amount of time required to change controlled pressure from one stable level to another in a high gas pressure device.

It is another object of the invention to provide a high gas pressure control system that avoids wasting pressurized gas.

Briefly described, and in accordance with one embodiment thereof, the invention provides a system for precisely pressurizing gas, by producing an initial pressure of gas in a pressure chamber having an inlet port and an outlet port while applying a predetermined amount of power to a heating element located in the pressure chamber. A change is computed in the amount of power needed to produce a desired change in the pressure of the gas in the pressure chamber. An updated amount of power equal to the algebraic sum of the needed change in the amount of power, and the updated amount of power is applied to the heating element to produce an average change in temperature of the gas in the pressure chamber. This rapidly produces a change in pressure of the gas in the pressure chamber corresponding precisely to the computed change in power. The initial pressure is produced by controlling an inlet valve connected to the inlet port and an outlet valve connected to the outlet port. The updated amount of power is applied to the heating element with the inlet valve and outlet valve both closed. An external control volume is connected in open fluid communication with the pressure chamber, so the pressure of gas in the control volume is essentially the same as the pressure of the gas in the pressure chamber. The measurement of gas pressure, computing of changes in power applied to the heating element, and applying updated amounts of power to the heating element are repeated until the pressure of the gas in the pressure chamber and the control volume reaches a desired level. In the described embodiments of the invention, the pressure of gas in the control volume is greater than roughly 1000 to 2000 pounds per square inch.

BRIEF DESCRIPTION OF THE DRAWINGS

FIG. 1 is a schematic diagram of the high pressure gas control system of the present invention.

DETAILED DESCRIPTION OF THE PREFERRED EMBODIMENT

Referring now to FIG. 1, the precise, high pressure control system of the present invention includes a pressure chamber 10 enclosing a volume 12. A pressure transducer 30 that opens into volume 12 is connected by electrical conductors 31 to a computer 37 that controls a gas pressure controller 21. An external device, hereinafter referred to as control volume 32, is connected in open fluid communication with volume 12 of pressure chamber 10.

Pressure chamber inlet port 13 is connected to a pneumatically controlled inlet valve 15. Pneumatically controlled inlet valve 15 is connected by tube 16 to a high pressure gas source. Inlet valve 15 is pneumatically controlled by gas pressure controllably supplied through tube 20 by controller 21. A suitable implementation of controller 21 is described in detail in commonly assigned co-pending patent application entitled "PRESSURE REGULATING SYSTEM FOR POSITIVE SHUT-OFF PRESSURE CONTROLLER", Ser. No. 514,659, filed Apr. 24, 1990 by Martin J. Girard, D. Scott Basham, and Pierre R. Delajoud.

Pressure chamber outlet 14 is connected by pneumatically controlled outlet valve 18 so as to vent gas from volume 12 to the ambient atmosphere when outlet valve 18 is open. Outlet valve 18 is pneumatically controlled by controlling the pressure in tube 22 supplied by controller 21. Pneumatically controlled valves 15 and 18 each include a needle valve, the needle of which responds to a diaphragm bounding a low pressure "dome" into which pneumatic line 20 or 22 feeds. The pressure in tubes 20 and 22 is below about 75 pounds per square inch, and can be controlled by differential opening and closing of inlet/outlet valves of the "manifold" described in the above-mentioned co-pending patent application. The rate of gas flow through inlet valve 15 and outlet valve 18 of FIG. 1 therefore can be controlled in a continuous "analog" fashion by gas pressure controller 21 in response to commands received from computer 37 which has read pressure from either a pressure transducer 30 connected to volume 12 or to external control volume 32.

A heating coil 24 is mounted inside volume 12 and bounds a volume 12A. The coil windings are reasonably close to the wall of pressure chamber 10. In a present embodiment of the invention, the pressure chamber 12 is approximately 50 cubic centimeters. The outside diameter of the cylindrical coil 24 is 20 millimeters and its length is 30 millimeters. The wall of pressure chamber 10 has an inside diameter of 36 millimeters and an outside diameter of 60 millimeters. The length of the interior volume 12 of pressure chamber 10 is 50 millimeters. The system described herein has been designed for precision control of working pressure up to approximately 10,000 pounds per square inch in a control volume such as 32 of up to 200 cubic centimeters. (The value of 200 cubic centimeters was chosen because high pressures in volumes exceeding about 200 cubic centimeters usually require adherence to special safety regulations.) The ends of heating coil 24 are connected by conductors 26A and 26B to a power controller 28, which can be a Hewlett-Packard 66334 programmable system DC power supply. Power controller 28 is capable of making minute controlled changes to the temperature of heating coil 24. Conductors 26A and 26B extend through leakproof insulating feedthroughs 27A and 27B, respectively.

In the present invention, the heating coil is composed of a solid metal-sheathed cable containing wires which are isolated from the sheath by highly compacted magnesium oxide. The small diameter of the sheath (1.6 mm outside diameter) having a low thermal inertia provides a very good response time of temperature to a change of power applied to the heating coil. Compacted magnesium oxide combining a good thermal conductivity and a low specific heat is a very good choice of material for electric isolation between the heating wire and the sheath. Using a sheath made of 304 stainless steel makes the passthrough easy to seal with standard high-pressure connections. In the described embodiment, all the parts in contact with the gas are made of 300 series stainless steel.

In accordance with the present invention, gas pressure controller 21 pneumatically controls inlet and outlet valves 15 and 18 in an analog fashion to bring the pressure in volume 12 to within approximately 0.1 percent of its desired final value. This much of the operation is conventional, except that in the past, inlet valve 15 and outlet valve 18 have been electric solenoid valves or electrically controllable variable orifice valves, rather than pneumatically controlled valves. During the foregoing initial stage of operation a few watts of power is being applied by power controller 28 to heating coil 24.

The initial power applied to the heating coil maintains a differential of temperature which is almost constant between coil 24 and wall 10 of volume 12. This difference of temperature depends mainly on the power in coil 24, the thermal conduction of the gas, and the distance between the facing surfaces of the coil and the wall in contact with the gas and the surface areas of those surfaces. The mean temperature of the gas due to the gradient of temperature in the gap between the facing surfaces of coil 24 and volume 12 is, of course, somewhere between the temperature of coil 24 and the temperature of the wall 10 of volume 12. This initial power is necessary to maintain a positive difference between the mean temperature of the gas and the temperature of the walls so that the control of pressure can be either increased or decreased.

It has been found that if the distance of the heating coil 24 from the thermal mass of the walls 10 of pressure chamber 12 is reasonably small, so that the volume 12A bounded by coil 24 is a substantial proportion of the total volume 12, then the changes in pressure in volume 12 are directly proportional to the changes of power applied to heating coil 24. The changes in pressure of gas in volume 12 are given by the following formula:

$$\frac{\Delta P}{P} = \frac{\Delta T}{T}, \quad (1)$$

where $\Delta T$ is the change in average temperature of gas in volume 12 after a change $\Delta W$ in the power being supplied by power controller 28 to heating coil 24 occurs.

$\Delta W_i$, the change in power supplied to coil 24, is given by the equation $$\Delta w_i = K1\left(\frac{P_T - P_{Ai}}{P_{Ai}}\right) - \left(\frac{P_{A(i-1)} - P_{Ai}}{\Delta t \cdot P_{Ai}}\right)K2 \quad (2)$$

where $P_T$ is the target pressure in volume 12 and external control volume 32, $P_{Ai}$ is the actual present pressure in volume 12, $P_{A(i-1)}$ is the pressure in volume 12 before time $\Delta t$ elapses, is the time difference between the measurement of pressures $P_{Ai}$ and $P_{Ai-1}$, K1 is an experimentally determined constant that depends on system geometry, and K2 is a constant that also depends on an experimentally determined constant that depends on system geometry. The values of K1 and K2 can be experimentally determined for the working system by K1 depends mainly on how much the pressure changes for a particular $\Delta W_i$, and K2 depends on how fast the pressure changes for that $\Delta W_i$. A good estimation of K1 can be found by dividing the change in power applied to coil 24 by the relative change in measured pressure due to the change of power $\Delta W$ after a stabilization time of about one minute has elapsed. Averaging the values found for a positive change and for a negative change substantially eliminates the effect of the evolution of the temperature of the thermal mass of the walls (10) during the determination. If external control volume 32 changes, the value of K1 is affected. A software "configuration" routine can be used to perform the test described above automatically to adjust the value of K1 to a new optimum value. The constant K2 adjusts the differential feedback action of the system. If, when making a significant change of pressure, there is an overshoot of the target pressure, K2 should be increased. If the time to reach the target pressure becomes too long, K2 should be decreased. For the prototype device described above, K1 has been found to be approximately 500 Watts and K2 has been found to be approximately 5000 Joules.

After the pressure in volume 12 has been brought to within ±1 to 0.1 percent of its target value by pneumatically controlling inlet valve 15 and outlet valve 18, a second stage of pressure control is accomplished by power controller 28, which raises or lowers the average temperature of heating coil 24 by changing the power supplied to coil 24, depending upon the pressure value measured by transducer 30. This technique increases the precision of the pressure produced in volume 12 from ±1 to 0.1 percent, within the limits of the resolution of the power controller 28, which resolution should be lower than ±0.01 percent. In the above embodiment of the invention, a final pressure value is obtained within approximately 30 seconds.

In operation, initially, a "nominal" amount of power of 0.5 to 5 Watts is applied to the coil 24 while an initial pressure built up in the volume 12 and control volume 32 by use of gas pressure controller 21 and valves 15 and 18 is accomplished with the nominal amount of power being applied to heating element 24.

After initializing a command to set a target pressure, a program executed by computer 37 initializes a timer. The program then reads the present pressure in volume 12, as measured by pressure transducer 30. Next, computer 37 reads both the current flowing through coil 24 and the voltage applied across it, and computes the power presently being supplied by multiplying the current in coil 24 by the voltage applied across it. Next, the program computes the difference between the present measured pressure and the target pressure. Then $\Delta W_i$ is computed according to equation (2). $\Delta W_i$ represents the algebraic change required in power being supplied to coil 24 in order to effectuate the pressure difference previously computed. The quantity $\Delta W_i$ is algebraically added to the present power to obtain an updated power. Power controller 28 then applies the updated power to coil 24, preferably by converting the updated power to a voltage to be applied across coil 24. Another approach to controlling the power delivered to coil 24 is to apply a constant magnitude voltage across coil 24, and vary the duty cycle of that voltage in accordance with $\Delta W_i$. Power controller 28 accomplishes and repeats this cycle approximately every 1.5 seconds in the above-described embodiment.

Thus far, the only limits on precision of the gas pressure in control volume 32 are (1) the limit of precision in reading the pressure by means of pressure transducer 30, (2) the limit of precision in computing the power changes $\Delta W_i$ in accordance with equation (2) and (3) the precision in then applying the computed amounts of power to heating coil 24. It is an unexpected result that it is practical to precisely control gas pressure in a closed volume by precisely controlling the amount of energy applied to a heating element located in the volume, in view of the uncontrollability of heat loss through walls of the volume and thermal gradients in the gas.

The invention makes practical much faster and more precise pressurizing of external volume 32 to within a very small tolerance of the target pressure than is possible in the prior art because of the much higher resolution control achievable by controlling flow of power to heating element 24. If, as in the prior art, mechanical valves or a screw press are utilized to approach the target value without incurring an undue risk of pressure overshooting, which is usually unacceptable, a large number of small increments involving mechanically controlling solenoid valves or controllable aperture devices consumes a great deal of time.

In contrast, heating element 24 responds very rapidly to changes in the power supplied to it, and the resolution is theoretically limited only by the limitations in reading the pressure, computing the quantity $\Delta W_i$ and applying it to the heating element 24.

Another advantage of the invention is that heating coil 24 can be utilized to compensate for changes in temperature of the gas in the total volume 12, 32 due to rapidly initially pressurizing it to an initial pressure (i.e., to compensate for adiabatic heating effects when pressure is increased or cooling effects when pressure is decreased) before beginning the fine temperature control.

By changing the initial nominal power downward or upward, depending on whether the change of pressure is respectively positive or negative for a certain amount of time before the end of the first stage of "pre-filling" or "pre-pressurizing" of gas in pressure chamber 12 and control volume 32 to within ±1 to 0.1% of the target value, it is possible to reduce the stabilization time of gas therein due to adiabatic thermal effects.

During the initial "coarse control" pressurization of gas in pressure chamber 12 and control volume 32 as previously described, adiabatic heating or cooling of the gas naturally occurs, causing a corresponding increase or decrease in the temperature of the gas in pressure chamber 12 and control volume 32. This makes precise control of the pressure in pressure chamber 12 and control volume 32 impossible until the temperature and pressure changes introduced by these adiabatic effects settle back to equilibrium values. After the "coarse control" pressure change has been completed, the temperature and pressure of the gas return to equilibrium values as excess heat introduced or withdrawn by the "coarse control" pressure change flows through the walls 10 of pressure chamber 12 and control volume 32 to reestablish thermal equilibrium.

In accordance with an embodiment of the present invention, the amount of heat energy that flows into or out of pressure chamber 12 and control volume 32 due to these adiabatic effects can be offset by adjusting the amount of power applied to heating coil 24 so as to keep the gas temperature in pressure chamber 12 and control volume 32 relatively steady. This greatly reduces the amount of time required to stabilize the initial pressure and temperature before the above-described defined pressure control can be accomplished with the desired precision.

For example, if the gas pressure is increased to an initial "coarse control" 0 value without any compensation by heating coil 24, the gas temperature increases. The gas pressure and temperature then decay to equilibrium values as excess heat introduced by the adiabatic effects flows out through the walls of pressure chamber 12 and control volume 32. However, if the amount of energy being applied to coil 32 is simultaneously reduced by an amount equal to the excess heat introduced by the adiabatic effects, the gas temperature remains relatively constant. The approximate amount by which the energy applied to coil 24 must be reduced to accomplish this can be determined empirically by measuring the peak pressure at the end of the first stage of control in pressure chamber 12 occurring as a result of a pressure change and then measuring the energy after the temperature and pressure in pressure chamber 32 have return to equilibrium values. The integration of the changes of power over the time to return to the peak pressure gives a good approximate indication of the amount by which the energy applied to heating coil 24 must be adjusted to compensate for the adiabatic effects while making a pressure change.

While the invention has been described with reference to several particular embodiments thereof, those skilled in the art will be able to make the various modifications to the described embodiments of the invention without departing from the true spirit and scope of the invention. It is intended that all combinations of elements and steps which perform substantially the same function in substantially the same way to achieve the same result are within the scope of the invention. For example, it should be appreciated that although precision control of gas at high pressures is achieved by the invention, very precise control of gas pressure at much lower pressures, for example at atmospheric pressure, is just as easily achievable, although the lower pressure limits at which high accuracy is achievable have not been determined.

What is claimed is:

1. A method of precisely pressurizing gas, comprising the steps of:
   (a) producing an initial pressure of gas in a pressure chamber having an inlet port and an outlet port while applying a predetermined amount of power to a heating element located in the pressure chamber; and
   (b) computing a change needed in the amount of power to produce a desired change in the pressure of the gas in the pressure chamber;
   (c) applying an updated amount of power equal to the algebraic sum of the needed change in the amount of power and the predetermined amount of power to the heating element to produce an average change in temperature of the gas in the pressure chamber, to thereby rapidly produce a change in pressure of the gas in the pressure chamber corresponding precisely to the computed change in power.

2. The method of claim 1 wherein step (b) includes computing the change needed in the amount of power according to the equation $$\Delta w_i = K1 \left( \frac{P_T - P_{Ai}}{P_{Ai}} \right) - \left( \frac{P_{A(i-1)} - P_{Ai}}{\Delta t \cdot P_{Ai}} \right) K2$$

where $P_T$ is a desired pressure in the pressure chamber, $P_{Ai}$ is the present pressure in the pressure chamber, $P_{A(i-1)}$ is the pressure in the pressure chamber before the time $\Delta T$ elapses, and K1 and K2 are constants that are dependant on the configuration of a system including the pressure chamber.

3. The method of claim 1 wherein step (a) is performed by controlling an inlet valve connected to the inlet port and an outlet valve connected to the outlet port, and step (b) is performed with the inlet valve and outlet valve both closed.

4. The method of claim 3 wherein an external control volume is connected in open fluid communication with the pressure chamber, so the pressure of gas in the control volume is essentially the same as the pressure of the gas in the pressure chamber, the method including repeating steps (b) and (c) until the pressure of the gas in the pressure chamber and the control volume reaches a desired level.

5. The method of claim 4 including operating a power controller in response to measured pressure of gas in the pressure chamber to stop computing the changes to the heating element after the pressure of gas in the pressure chamber reaches the preselected level.

6. The method of claim 4 wherein the initial pressure is greater than roughly 1000 pounds per square inch.

7. The method of claim 1 including reducing an amount of time required for stabilization of pressure of gas in the pressure chamber after step (a) by adjusting the predetermined amount of power during step (a) to compensate for adiabatic effects on temperature and pressure of gas in the pressure chamber.

8. An apparatus for precisely pressurizing gas, comprising in combination:
   (a) a pressure chamber having an inlet valve means and an outlet valve means;
   (b) a heating element located in the pressure chamber;
   (c) means for applying a predetermined amount of power to the heating element;
   (d) means for producing an initial pressure of gas in the pressure chamber by controlling the inlet valve means and the outlet valve means while applying the predetermined amount of energy to the heating element;
   (e) means for measuring the pressure of the gas in the pressure chamber;
   (f) means for computing a change needed in the amount of power to produce the desired change in response to the pressuring measuring means;
   (g) means for closing the inlet valve means and the outlet valve means after the initial pressure has been produced;
   (h) means for applying an updated amount of power equal to the algebraic sum of the needed change in the amount of power and the predetermined amount of power to the heating element to produce an average change in temperature of the gas in the pressure chamber, to thereby rapidly produce a change in pressure of the gas in the pressure chamber corresponding precisely to the computed change in power.

9. The apparatus of claim 7 wherein the computing means includes means for computing the change needed in the amount of power according to the equation $$\Delta w_i = K1 \left( \frac{P_T - P_{Ai}}{P_{Ai}} \right) - \left( \frac{P_{A(i-1)} - P_{Ai}}{\Delta t \cdot P_{Ai}} \right) K2$$

where $P_T$ is a desired pressure in the pressure chamber, $P_{Ai}$ is the present pressure in the pressure chamber, $P_{A(i-1)}$ is the pressure in the pressure chamber after the time $\Delta T$ elapses, and K1 and K2 are constants that are dependent on the configuration of the apparatus.

10. The apparatus of claim 8 including an external control volume is connected in open fluid communication with the pressure chamber, so the pressure of gas in the control volume is essentially the same as the pressure of the gas in the pressure chamber.

11. The apparatus of claim 10 including repeatedly computing the change needed in the amount of power to produce a desired change and producing an updated amount of power and applying the updated amount of power to the heating element to maintain the target pressure.

12. The apparatus of claim 11 including a power controller and means for operating the power controller in response to measured pressure of gas in the pressure chamber to stop computing the changes to the heating element after the pressure of gas in the pressure chamber reaches the preselected level.

13. The apparatus of claim 11 wherein the initial pressure is greater than roughly 1000 pounds per square inch.

* * * * *